(12) United States Patent
Hernandez

(10) Patent No.: US 12,530,957 B2
(45) Date of Patent: Jan. 20, 2026

(54) VEHICLE OCCUPANCY SENSOR SYSTEMS AND METHODS

(71) Applicant: Monica Hernandez, Harbor City, CA (US)

(72) Inventor: Monica Hernandez, Harbor City, CA (US)

( * ) Notice: Subject to any disclaimer, the term of this patent is extended or adjusted under 35 U.S.C. 154(b) by 0 days.

(21) Appl. No.: 18/241,907

(22) Filed: Sep. 4, 2023

(65) Prior Publication Data
US 2025/0014447 A1 Jan. 9, 2025

Related U.S. Application Data

(63) Continuation-in-part of application No. 18/219,097, filed on Jul. 7, 2023, now abandoned, which is a continuation-in-part of application No. 18/099,267, filed on Jan. 20, 2023, now abandoned, which is a continuation-in-part of application No. 16/202,368, filed on Nov. 28, 2018, now Pat. No. 11,747,313.

(60) Provisional application No. 62/721,141, filed on Aug. 22, 2018, provisional application No. 62/721,190, filed on Aug. 22, 2018.

(51) Int. Cl.
*G08B 21/22* (2006.01)
*B60W 40/08* (2012.01)
*G07C 9/00* (2020.01)

(52) U.S. Cl.
CPC ............ *G08B 21/22* (2013.01); *B60W 40/08* (2013.01); *G07C 9/00309* (2013.01); *B60W 2040/0881* (2013.01); *G07C 2009/00507* (2013.01)

(58) Field of Classification Search
None
See application file for complete search history.

(56) References Cited

U.S. PATENT DOCUMENTS

| | | |
|---|---|---|
| 5,333,703 A | 8/1994 | James |
| 9,227,484 B1 | 1/2016 | Justice |
| 9,845,050 B1 | 12/2017 | Garza |
| 9,998,899 B1 | 6/2018 | Tannenbaum |
| 10,115,029 B1 | 10/2018 | Day |
| 2002/0161501 A1 | 10/2002 | Dulin |
| 2005/0212681 A1 | 9/2005 | Dzurko |
| 2008/0117079 A1 | 5/2008 | Hassan |
| 2012/0310547 A1 | 12/2012 | Cristoforo |
| 2015/0130604 A1 | 5/2015 | Gomez Collazo |
| 2016/0053699 A1 | 2/2016 | Ozkan |
| 2016/0075296 A1 | 3/2016 | Alderman |
| 2016/0200168 A1 | 7/2016 | Boyer |

(Continued)

*Primary Examiner* — Peter D Nolan
*Assistant Examiner* — Michael F Whalen

(57) ABSTRACT

The present disclosure relates to an occupancy sensor system for a vehicle. The system includes a central processing unit (CPU) electrically connected to a power source of the vehicle, one or more sensors for inputting raw data into the CPU, an electronic device with a user interface, and a wireless communications bus connected to the CPU. The CPU compares the raw data received from the sensors with a predetermined safety threshold and transmits an alert to the electronic device via the wireless communications bus if the raw data is not within the safety threshold. The system further includes a global positioning system (GPS) transceiver coupled to the vehicle for receiving radio transmissions from GPS satellites, and a radio-frequency identification (RFID) reader chip.

19 Claims, 11 Drawing Sheets

(56) References Cited

U.S. PATENT DOCUMENTS

| | | |
|---|---|---|
| 2017/0158186 A1 | 6/2017 | Soifer |
| 2017/0318135 A1 | 11/2017 | Han |
| 2018/0025604 A1 | 1/2018 | Protopsaltis |
| 2018/0053390 A1 | 2/2018 | Morris |
| 2018/0056814 A1 | 3/2018 | Tanyi |
| 2018/0056988 A1 | 3/2018 | Heil, Jr. |
| 2018/0126950 A1* | 5/2018 | Alderman ............... H04L 67/30 |
| 2018/0197029 A1 | 7/2018 | Ali |
| 2018/0370431 A1 | 12/2018 | Wincek |
| 2019/0077217 A1 | 3/2019 | Yu |
| 2019/0088104 A1* | 3/2019 | Crewe .................... G08B 21/22 |
| 2019/0139386 A1 | 5/2019 | Arinze |
| 2019/0193590 A1 | 6/2019 | Labombarda |
| 2019/0215672 A1* | 7/2019 | Orris ................. B60H 1/00742 |

* cited by examiner

VEHICLE OCCUPANCY SENSOR SYSTEMS AND METHODS

PRIORITY CLAIM

This application is a U.S. Continuation-In-Part Utility Application entitled, "VEHICLE OCCUPANCY SENSOR SYSTEMS AND METHODS" which claims priority to U.S. Continuation-In Part Utility application Ser. No. 18/219,097 filed Jul. 7, 2023 entitled, "Methods and Systems for Detection and Prevention of Unattended Vehicle Deaths" which claims priority to U.S. Continuation-In Part Utility application Ser. No. 16/202,368 filed Nov. 28, 2018 entitled, "Methods and Systems for Detection and Prevention of Unattended Vehicle Deaths" which claims priority to U.S. Provisional Application No. 62/721,141, filed Aug. 22, 2018 entitled, "Mayday Sensor Suite TM Aftermarket" and U.S. Provisional Application No. 62/721,190 filed on Aug. 22, 2018 entitled, "Mayday Sensor Suite TM Integrated" the entirety of which is hereby incorporated by reference as if fully set forth herein.

FIELD OF THE EMBODIMENTS

Embodiments generally relate to computerized automobile sensors and controls, and in particular to systems and methods to prevent unattended vehicle deaths using sensors and wireless communications.

BACKGROUND OF THE EMBODIMENTS

"Hot car deaths" are a colloquial term to refer to deaths of persons (typically children or special needs individuals) or pets caused by heatstroke or hyperthermia due to being left alone in a car for a long time. A typical scenario involves a parent leaving an infant inside a car under the sun and forgetting about the child, returning many hours later to find the child has died of heatstroke. According to some estimates, an average of 37 children die each year in unattended vehicles.

While some technological solutions have been proposed and implemented to prevent these incidents, none have been able to provide a reliable system that mitigates the chances of death by detecting, alerting and acting appropriately based on the circumstances.

Previous approaches to occupancy sensor systems for vehicles have typically involved using individual sensors to detect the presence of occupants within the vehicle. These sensors may include infrared sensors, ultrasonic sensors, or pressure sensors, among others. While these previous approaches have made advancements in detecting and monitoring vehicle occupancy, they have not provided a comprehensive solution that combines all of the features described in this disclosure. Specifically, none of these approaches have integrated wireless communication capabilities, such as a wireless communications bus, to transmit alerts to remote electronic devices. Additionally, the use of a radio-frequency identification (RFID) reader chip has not been incorporated into previous occupancy sensor systems. Therefore, there is a need in the art for an improved occupancy sensor system for vehicles that addresses these limitations and provides enhanced functionality and convenience.

SUMMARY OF THE EMBODIMENTS

Vehicle safety is a critical concern for occupants such as both drivers and passengers. Various approaches are developed to address safety concerns, including the use of sensors and processors to monitor and analyze vehicle conditions. However, existing approaches have not provided a comprehensive solution for detecting and mitigating dangerous environmental conditions in a vehicle. One approach to vehicle safety involves monitoring occupancy data and environmental data to determine the safety status of the vehicle. For example, occupancy data can be collected using sensors to detect the presence of occupants in the vehicle, while environmental data can be collected to determine the temperature, humidity, and other environmental conditions within the vehicle. However, existing approaches have not effectively correlated occupancy data and environmental data into an occupancy pattern signature to identify dangerous environmental conditions.

Another approach to vehicle safety involves setting thresholds for occupancy data and environmental data to determine when a dangerous environmental condition is present. For example, a threshold can be set for the temperature within the vehicle, and if the temperature exceeds the threshold, a dangerous environmental condition is detected. However, existing approaches have not effectively identified dangerous environmental conditions based on a combination of occupancy data and environmental data to form an occupancy pattern signature.

Additionally, existing approaches have not provided a comprehensive solution for mitigating dangerous environmental conditions in a vehicle. While some approaches have included communication components to send alerts to electronic devices, they have not included pre-mitigation assessment modules to identify safe rescue options or environmental controls components to mitigate the dangerous environmental condition. Therefore, there is a need in the art for a comprehensive solution that combines occupancy monitoring, environmental monitoring, detection logic, threshold identification, communication components, pre-mitigation assessment modules, and environmental controls components to detect and mitigate dangerous environmental conditions in a vehicle. However, no currently known approaches have provided a comprehensive solution that combines the features described in this disclosure.

Disclosed herein are system, method, and computer program product embodiments for detecting, alerting, and acting to prevent unattended vehicle deaths. An embodiment operates by receiving one or more signals from one or more presence sensors in a vehicle and analyzing the signals to detect the presence of a person or animal inside the vehicle. The system further receives one or more signals from one or more environment sensors on the vehicle and analyzes the signals to detect a dangerous environmental condition. If the system determines that both the presence of a person or animal has been detected inside the vehicle and a dangerous environmental condition has been detected, it activates one or more vehicle systems that mitigate the dangerous environmental condition and sends an alert to one or more predetermined recipients.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

An occupancy sensor system for a vehicle may include a central processing unit configured to be electrically connected to a power source of the vehicle. An occupancy sensor system for a vehicle may include one or more sensors configured to input raw data into the central processing unit. An occupancy sensor system for a vehicle may include an electronic device having a graphic user interface. An occupancy sensor system for a vehicle may include a wireless communications bus electrically connected to the central processing unit. The central processing unit is configured to compare the raw data received from the one or more sensors with a predetermined safety threshold, wherein if the raw data is not within the predetermined safety threshold, the central processing unit is configured to transmit an alert to the electronic device using the wireless communications bus. An occupancy sensor system for a vehicle may include a global positioning system transceiver coupled to the vehicle. The global positioning system transceiver is configured to receive a radio transmissions broadcast emitted by one or more global positioning system satellites. An occupancy sensor system for a vehicle may include a radio-frequency identification reader chip in communication with a key fob.

BRIEF DESCRIPTION OF THE DRAWINGS

The accompanying drawings are incorporated herein and form a part of the specification.

DESCRIPTION OF THE PREFERRED EMBODIMENTS

Provided herein are system, method and/or computer program product embodiments, and/or combinations and sub-combinations thereof, for detecting, alerting, and acting to prevent unattended vehicle deaths. Embodiments include an integrated vehicle occupancy system that relies on the vehicle's on-board computer, the computer connected to a suite of sensors common in modern vehicles in addition to other sensors embedded within the vehicle's structure. The system can use sensors to detect that a person or animal has been left unattended inside the vehicle and that conditions inside the vehicle are dangerous (e.g., the cabin is very hot because the car has been left in the sun). The system can then issue alerts and/or take corrective actions to mitigate the dangerous conditions.

Figure 1:
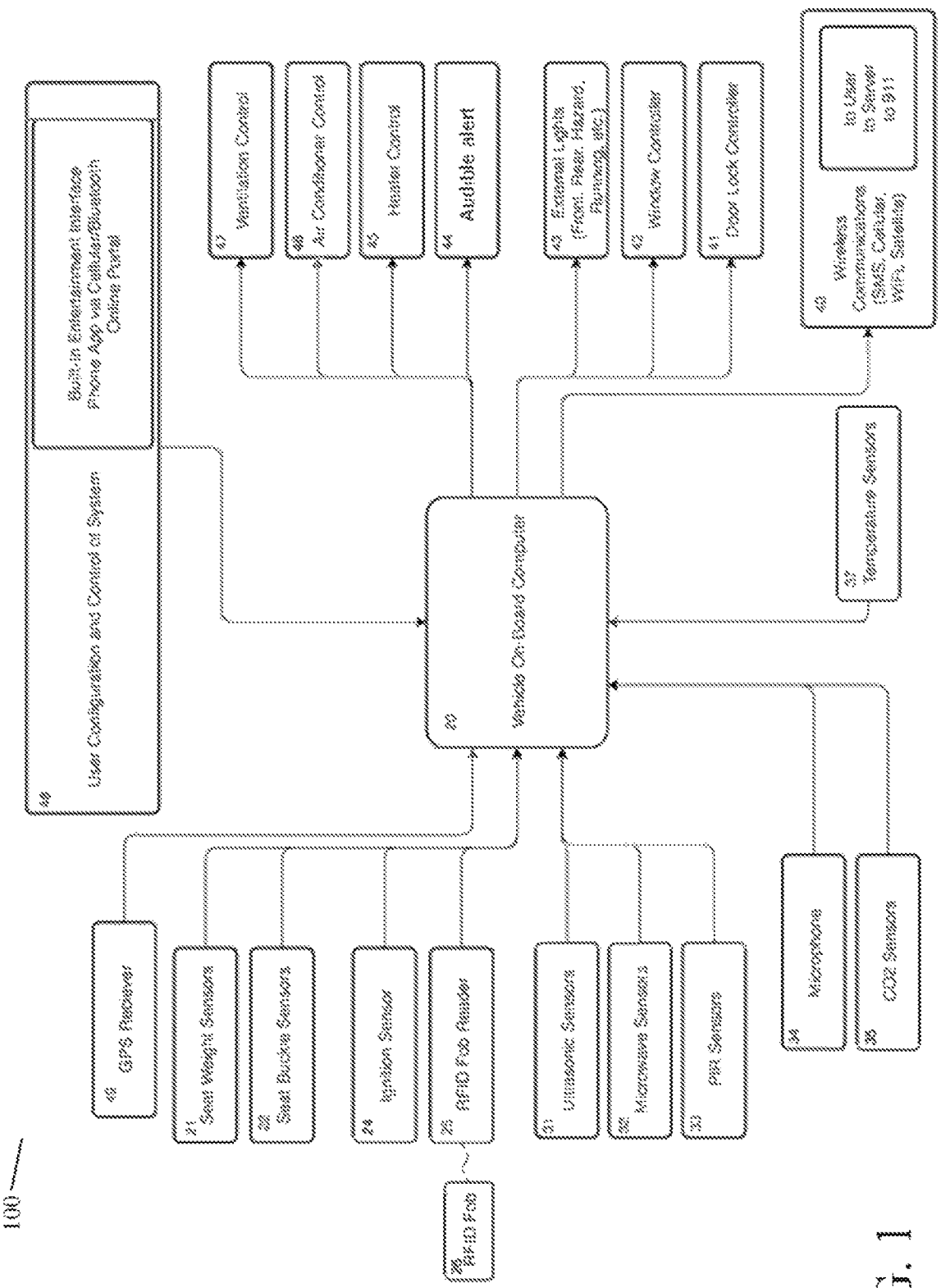
FIG. 1 shows a system diagram for an unattended vehicle death prevention system, according to an example embodiment.

FIG. 1 shows a system diagram for an unattended vehicle death prevention system 100, according to an example embodiment. System 100 includes a vehicle on-board computer 20 which executes software code for obtaining data from various vehicle sensors and controlling vehicle components. The system may be powered through the vehicle's alternator and 12 v battery. FIG. 1 shows on-board computer 20 receives input from one or more presence sensors. As used herein, a presence sensor is a sensor that can be used to detect when a person or animal is present in a vehicle. As an example, ultrasonic sensors 31, microwave sensors 32, passive infrared sensors 33, seat weight sensors 21, seat buckle sensors 22, microphone 34, and carbon dioxide sensors 35 can be presence sensors. Presence sensors may be positioned inside or around the vehicle. Computer 20 may analyze signals from any combination of these sensors to detect if a person or animal is inside the vehicle. As an example, an ultrasonic sensor 31 may be aimed towards a location in the car where a child passenger typically sits, e.g., the back seat. Ultrasonic sensors measure the distance to an object using ultrasonic sound waves. Computer 20 may calibrate the ultrasonic sensor to determine the distance read between the sensor and the empty seat. Computer 20 may then periodically read the signal from the ultrasonic sensor and determine that the distance read by the sensor is less than the predetermined empty-seat-distance, and thus determine that a person or animal is likely in the seat. Microwave sensors 32 may be used in a similar fashion.

Computer 20 may continuously receive and evaluate readings from various sensors to corroborate whether a person or animal is actually in the car and not another object. For example, a passive infrared sensor 32 may be used to distinguish between inanimate objects and a living thing, e.g., person or animal. A passive infrared sensor is an electronic sensor that measures infrared (IR) light radiating from objects in its field of view, and are often used in motion detectors.

In other examples, computer 20 may analyze microphone 34 signals to detect particular noises, e.g., a child crying, talking, dog bark, moving or tapping noises, etc. Seat weight sensors 21 may detect a particular weight corresponding to a human or animal, while seat belt buckle sensor can detect that a seat belt is still 22 buckled. Carbon dioxide sensors 35 may detect an increase in carbon dioxide inside the vehicle, indicating a person may be inside the car with the windows closed. While particular presence sensors and presence detection methods are described herein, this disclosure contemplates any suitable presence sensors and presence detection methods.

Computer 20 may further receive input from one or more environment sensors. As used herein, an environment sensor is a sensor that can be used detect particular environmental conditions in or around the vehicle. As an example, temperature sensors 37, carbon dioxide sensor 35, or toxic or hazardous gas sensors (e.g., carbon monoxide sensors, smoke sensors, car exhaust fumes sensor, etc.) can be environment sensors. Computer 20 may analyze the signals from environment sensors to detect dangerous or hazardous environmental condition. As an example, computer 20 may read a temperature from a temperature sensor 37 and determine that the temperature inside a vehicle is dangerously high or low. Other sensors may monitor for toxic or hazardous gases at dangerous levels, such as, carbon dioxide, carbon monoxide, car exhaust fumes, etc. As such, computer 20 may be able to detect to dangerous conditions other than hot or cold cars, such as a gas-powered vehicle that has been left running in a confined space and poses a risk of intoxication for occupants.

Computer 20 can control various systems in the vehicle in order to take action after detecting a person or animal is inside the vehicle while the conditions inside the vehicle are unsafe. For example, computer 20 may communicate with a door lock controller 41, window controller 42, external lights control 43, audible alert 44, heater control 45, air conditioner control 46 and/or ventilation control 47 to perform appropriate actions to mitigate dangerous conditions or alert nearby persons of the dangerous situation. As an example, if a child has been left unattended in a hot vehicle, computer 20 may turn on the air conditioning to lower the temperature inside the vehicle. Computer 20 may turn on the vehicle heater if a child has been left in a vehicle at very cold temperatures. The system may unlock doors, open windows, flash lights, and sound an audible alert such as a car alarm and/or car horn to alert any nearby persons to the situation and allow them to help. Computer 20 may thus monitor conditions in the vehicle and perform appropriate actions to mitigate risks.

Computer 20 may further be connected to a wireless communications system 40, and may control it to transmit notifications, messages, or phone calls based on detecting dangerous situations as explained above. Wireless communications system 40 may include cellular antennas, satellite system, Wi-Fi, etc. As example, computer 20 may call or message emergency services (e.g., 911) or numbers from a predefined list of contacts to alert of the dangerous situation.

Computer 20 may receive configuration information from a user through a user interface 48 in communication with computer 20. The interface may be provided through a built-in entertainment system (e.g., infotainment system) in the vehicle, a mobile app, a web interface, etc. As an example, a built-in infotainment system in the vehicle may provide menus and commands to activate and configure computer 20 for detecting, alerting, and acting to prevent unattended vehicle deaths, including entering emergency contacts information and configuring what actions to perform during a detected emergency. Interface 48 may thus be used to customize alert recipients and alert messages, configure and test the system, and view system status information.

Figure 2:
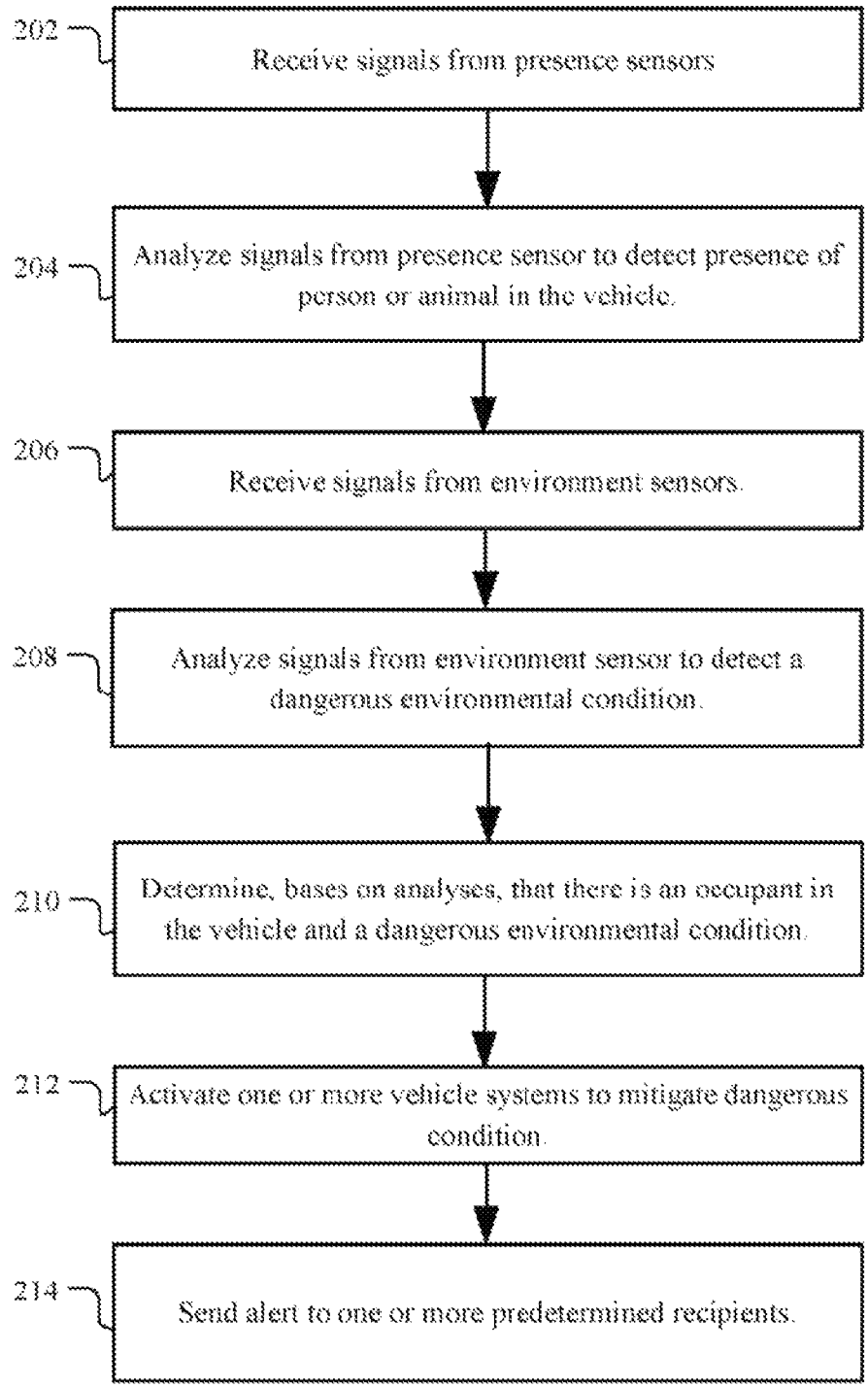
FIG. 2 is flowchart for a method of detecting, alerting, and acting to prevent unattended vehicle deaths, according to an example embodiment.

FIG. 2 is a flowchart for a method 200 of for detecting, alerting, and acting to prevent unattended vehicle deaths, according to particular embodiments. Method 200 can be performed by processing logic that can comprise hardware (e.g., circuitry, dedicated logic, programmable logic, microcode, etc.), software (e.g., instructions run on a processing device), or a combination thereof. In particular embodiments, computer 20 may initiate method 200 upon determining that a vehicle is unattended. Computer 20 may determine that a vehicle is unattended based on one or more conditions, such as, for example, detecting that the vehicle's RFID fob reader 25 does not detect the presence of key fob 26, detecting that the vehicle's ignition is off, when the driver's seat weight and/or seat belt buckle indicate that the driver seat is unoccupied, etc.

At step 202, computer 20 receives one or more signals from one or more presence sensors in a vehicle. At step 204, computer 20 analyzes the one or more signals to detect the presence of a person or animal in the vehicle. As an example, computer 20 may continuously or repeatedly analyze the signals from the presence sensors (e.g., ultrasonic, microwave, infrared sensors, etc.). The analysis may involve, for example, comparing the signal reading to a previously calibrated value corresponding to an empty seat, thus indicating that something is occupying the seat. In an example, the analysis may involve determining whether the signal changes in a particular manner, thus detecting movement and indicating that a person or animal is occupying the vehicle.

In particular embodiments, presence sensors may monitor the outside of the vehicle, and analyzing for presence may include maintaining a count of the number of persons or animals that have entered and exited the vehicle. As an example, computer 20 may analyze signals to determine that two persons entered the vehicle, and later one person left. As such, computer 20 may determine that a person is present in the vehicle.

In particular embodiments, computer 20 may analyze carbon dioxide levels in the vehicle to determine whether a person is present. As an example, computer 20 may determine that the vehicle windows are open and activate the window controls to close the windows. Computer 20 may then continuously monitor the carbon dioxide sensor readings over time to determine if the levels of carbon dioxide inside the vehicle are increasing. An increasing level of carbon dioxide would indicate that a person or animal is inside the vehicle, as their breathing would produce carbon dioxide. While measuring the carbon dioxide, computer 20 may also monitor the temperature inside the vehicle to ensure that the occupants remain safe. Once the measurements have been taken, computer 20 may re-open the windows to reduce the threat of heat build-up in the vehicle.

At step 206, computer 20 receives one or more signals from one or more environment sensors on the vehicle. At step 208, computer 20 analyzes the one or more signals from the environment sensors to detect a dangerous environmental condition. Computer 20 may continuously or repeatedly analyze the signals from the presence sensors to detect dangerous conditions. As an example, computer 20 may continuously read the temperature from temperature sensor 37 to determine if the temperature inside the vehicle is outside of a preconfigured safe range. It is within the scope of this invention for a temperature sensor to be a digital temperature sensor that measures temperature and relative humidity. The temperature sensor may be configured to detect temperatures within a range is approximately 0 to 50° C.+/−2° C. The humidity range may be a range between 20 to 90%+/−5%. Although the system may measure and obtain a temperature, the humidity may intensify the temperature and result in an individual feeling, for example, hotter than the measured temperature. Thus, the system may monitor both temperature and humidity to more accurately obviate individuals from experiencing heat stroke.

At step 210, computer 20 determines whether both the presence of a person or animal inside the vehicle and a dangerous environmental condition have been detected, based on the analyses of steps 204 and 208. If so, computer 20 performs actions as specified in the system configuration. At step 212, computer 20 activates one or more vehicle systems that mitigate the dangerous environmental condition. The actions taken may be configured by a user through interface 48. As an example, computer 20 may turn on the car ignition and activate the air conditioning if the vehicle is overheated, or close the windows and turn on the heater if the vehicle is at dangerously cold temperatures. In an example, computer 20 may detect unsafe levels of toxic gases inside the vehicle (e.g., carbon dioxide, carbon monoxide, car fumes, etc.) and may activate the vehicle's ventilation system in response. In particular embodiments, the system may continuously monitor conditions in the vehicle and adjust actions accordingly. As an example, the air conditioning may be activated until the temperature returns to a safe level and then adjusted to maintain the safe temperature. In an example, computer 20 activates car systems to alert nearby persons or passers-by of the emergency, such as activating an audible alert such as a car alarm and/or car horn, flashing lights, unlocking doors, etc.

There may be situations in which taking certain actions may be unsafe. As an example, if the vehicle is a gas-powered vehicle and it is in a confined space, turning on the air conditioning may cause car fumes to enter the vehicle. Computer 20 may take certain preventive measures to determine if it is safe to perform a mitigating action. In particular embodiments, computer 20 may analyze sensor readings to determine if the vehicle is in a confined space. It is within the scope of this invention for an external set of environmental sensors that may determine the outside conditions so that there is no need to open the windows in order to analyze the external conditions. In an example, the computer 20 may turn on the ignition and partially or completely open windows and analyze readings from dangerous gas sensors to determine if there is an increase in dangerous gases (e.g., carbon monoxide, car fumes, etc.). If the gas measurements increase above predetermined rate or concentration computer 20 determines the vehicle is likely in a confined space without proper ventilation, and in response turns off the ignition to avoid generating further toxic fumes. In an overheated vehicle scenario, computer 20 may open the vehicle windows and turn on the ventilation system without starting the vehicle engine. In a cold vehicle scenario, computer 20 may close the windows.

In particular embodiments, computer 20 may further receive signals from surroundings sensors. As used herein, surrounding sensors are sensors that monitor areas around the vehicle. As an example, surrounding sensors may be sonar, radar, LiDAR, cameras, etc., such as proximity sensors used for automated driving, lane changing, parking, etc. Computer 20 may use surrounding sensors to determine if the vehicle is in an enclosed space before performing other mitigating actions, as explained above.

At step 214, computer 20 sends an alert to one or more predetermined recipients. The predetermined recipients may be configured by a user through user interface 48, e.g., contacts, emergency response, 911, etc. The type of alert may also be configured, such as, for example, SMS text messages, pre-recorded or computer-generated voice calls or voicemails, mobile push notifications through a mobile application, etc. The information included in the alerts and the recipients of the alerts may be based on a determined severity of the threat posed to occupants of the vehicle. In particular embodiments, the alerts may include a location of the vehicle, obtained from a GPS receiver 49, for example. Computer 20 may use any suitable means of wireless communications, such as cellular, satellite, Wi-Fi, etc.

Figure 3:
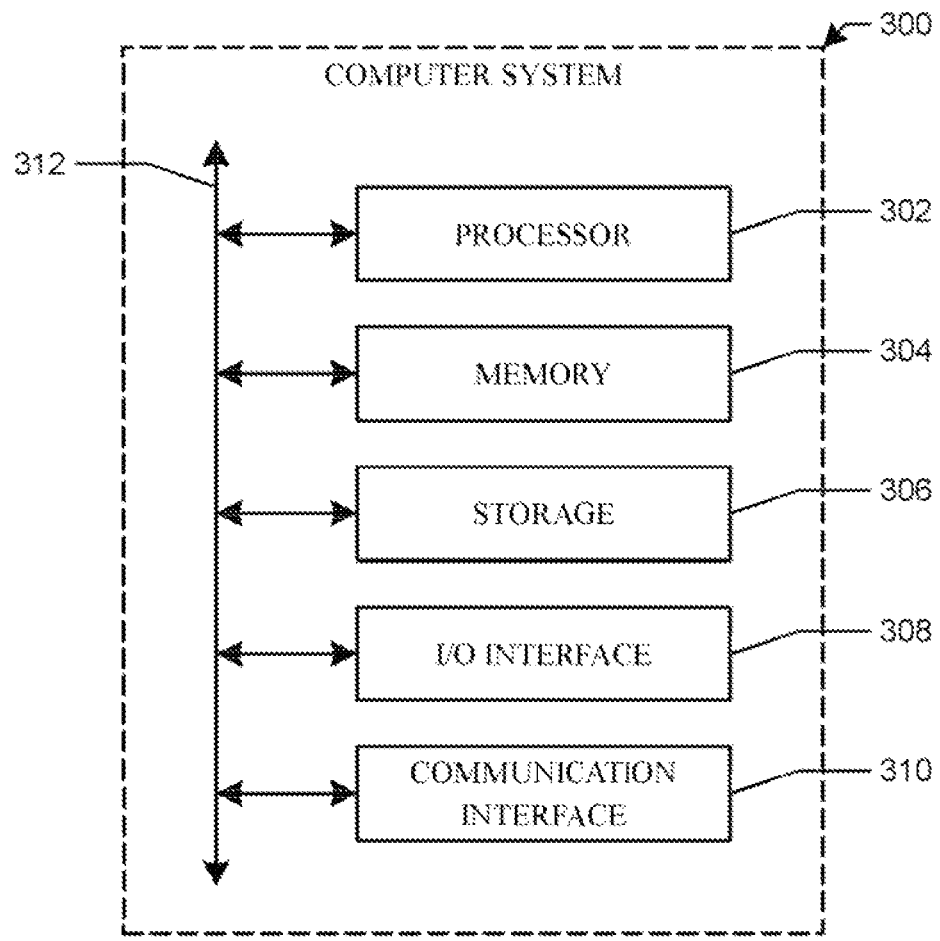
FIG. 3 is an example computer system useful for implementing various embodiments.

FIG. 3 illustrates an example computer system 300. In particular embodiments, one or more computer systems 300 perform one or more steps of one or more methods described or illustrated herein. In particular embodiments, one or more computer systems 300 provide functionality described or illustrated herein. In particular embodiments, software running on one or more computer systems 300 performs one or more steps of one or more methods described or illustrated herein or provides functionality described or illustrated herein. Particular embodiments include one or more portions of one or more computer systems 300. Herein, reference to a computer system may encompass a computing device, and vice versa, where appropriate. Moreover, reference to a computer system may encompass one or more computer systems, where appropriate.

This disclosure contemplates any suitable number of computer systems 300. This disclosure contemplates computer system 300 taking any suitable physical form. As example, computer system 300 may be an embedded computer system, a desktop computer system, a laptop or notebook computer system, a mainframe, a mobile telephone, a personal digital assistant (PDA), a server, a tablet computer system, or a combination of two or more of these. Where appropriate, computer system 300 may include one or more computer systems 300; be unitary or distributed; span multiple locations; span multiple machines; span multiple data centers; or reside in a cloud, which may include one or more cloud components in one or more networks. Where appropriate, one or more computer systems 300 may perform without substantial spatial or temporal limitation one or more steps of one or more methods described or illustrated herein. As an example, one or more computer systems 300 may perform in real time or in batch mode one or more steps of one or more methods described or illustrated herein. One or more computer systems 300 may perform at different times or at different locations one or more steps of one or more methods described or illustrated herein, where appropriate.

In particular embodiments, computer system 300 includes a processor 302, memory 304, storage 306, an input/output (I/O) interface 308, a communication interface 310, and a bus 312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 302 includes hardware for executing instructions, such as those making up a computer program. As an example, to execute instructions, processor 302 may retrieve (or fetch) the instructions from an internal register, an internal cache, memory 304, or storage 306; decode and execute them; and then write one or more results to an internal register, an internal cache, memory 304, or storage 306. In particular embodiments, processor 302 may include one or more internal caches for data, instructions, or addresses. This disclosure contemplates processor 302 including any suitable number of any suitable internal caches, where appropriate. In particular embodiments, processor 302 may include one or more internal registers for data, instructions, or addresses. This disclosure contemplates processor 302 including any suitable number of any suitable internal registers, where appropriate. Where appropriate, processor 302 may include one or more arithmetic logic units (ALUs); be a multi-core processor; or include one or more processors 302. Although this disclosure describes and illustrates a particular processor, this disclosure contemplates any suitable processor.

In particular embodiments, memory 304 includes main memory for storing instructions for processor 302 to execute or data for processor 302 to operate on. As an example, computer system 300 may load instructions from storage 306 or another source (such as, for example, another computer system 300) to memory 304. Processor 302 may then load the instructions from memory 304 to an internal register or internal cache. To execute the instructions, processor 302 may retrieve the instructions from the internal register or internal cache and decode them. During or after execution of the instructions, processor 302 may write one or more results (which may be intermediate or final results) to the internal register or internal cache. Processor 302 may then write one or more of those results to memory 304. In particular embodiments, processor 302 executes only instructions in one or more internal registers or internal caches or in memory 304 (as opposed to storage 306 or elsewhere) and operates only on data in one or more internal registers or internal caches or in memory 304 (as opposed to storage 306 or elsewhere). One or more memory buses (which may each include an address bus and a data bus) may couple processor 302 to memory 304. Bus 312 may include one or more memory buses, as described below. In particular embodiments, memory 304 includes random access memory (RAM). This RAM may be volatile memory, where appropriate Memory 304 may include one or more memories 304, where appropriate. Although this disclosure describes and illustrates particular memory, this disclosure contemplates any suitable memory.

In particular embodiments, storage 306 includes mass storage for data or instructions. As an example, storage 306 may include a hard disk drive (HDD), a floppy disk drive, flash memory, an optical disc, a magneto-optical disc, magnetic tape, or a Universal Serial Bus (USB) drive or a combination of two or more of these. Storage 306 may include removable or non-removable (or fixed) media, where appropriate. Storage 306 may be internal or external to computer system 300, where appropriate. In particular embodiments, storage 306 is non-volatile, solid-state memory. In particular embodiments, storage 306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 306 taking any suitable physical form. Storage 306 may include one or more storage control units facilitating communication between processor 302 and storage 306, where appropriate. Where appropriate, storage 306 may include one or more storages 306. Although this disclosure describes and illustrates particular storage, this disclosure contemplates any suitable storage.

In particular embodiments, I/O) interface 308 includes hardware, software, or both, providing one or more interfaces for communication between computer system 300 and one or more I/O devices. Computer system 300 may include one or more of these I/O devices, where appropriate. One or more of these I/O devices may enable communication between a person and computer system 300. As an example, an I/O device may include a key board, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 308 for them. Where appropriate, I/O interface 308 may include one or more device or software drivers enabling processor 302 to drive one or more of these I/O devices. I/O interface 308 may include one or more I/O interfaces 308, where appropriate. Although this disclosure describes and illustrates a particular I/O interface, this disclosure contemplates any suitable I/O interface.

In particular embodiments, communication interface 310 includes hardware, software, or both providing one or more interfaces for communication (such as, for example, packet-based communication) between computer system 300 and one or more other computer systems 300 or one or more networks. As an example, communication interface 310 may include a network interface controller (NIC) or network adapter for communicating with an Ethernet or other wire based network or a wireless NIC (WNIC) or wireless adapter for communicating with a wireless network, such as a WI-PI network. This disclosure contemplates any suitable network and any suitable communication interface 310 for it. As an example, computer system 300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 300 may communicate with a wireless PAN (WPAN) (such as, for example, a BLUETOOTH WPAN), a WI-PI network, a WI-MAX network, a cellular telephone network (such as, for example, a Global System for Mobile Communications (GSM) network), satellite, or other suitable wireless network or a combination of two or more of these. Computer system 300 may include any suitable communication interface 310 for any of these networks, where appropriate. Communication interface 310 may include one or more communication interfaces 310, where appropriate. Although this disclosure describes and illustrates a particular communication interface, this disclosure contemplates any suitable communication interface.

In particular embodiments, bus 312 includes hardware, software, or both coupling components of computer system 300 to each other. As an example, bus 312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 312 may include one or more buses 312, where appropriate. Although this disclosure describes and illustrates a particular bus, this disclosure contemplates any suitable bus or interconnect.

Figure 4:
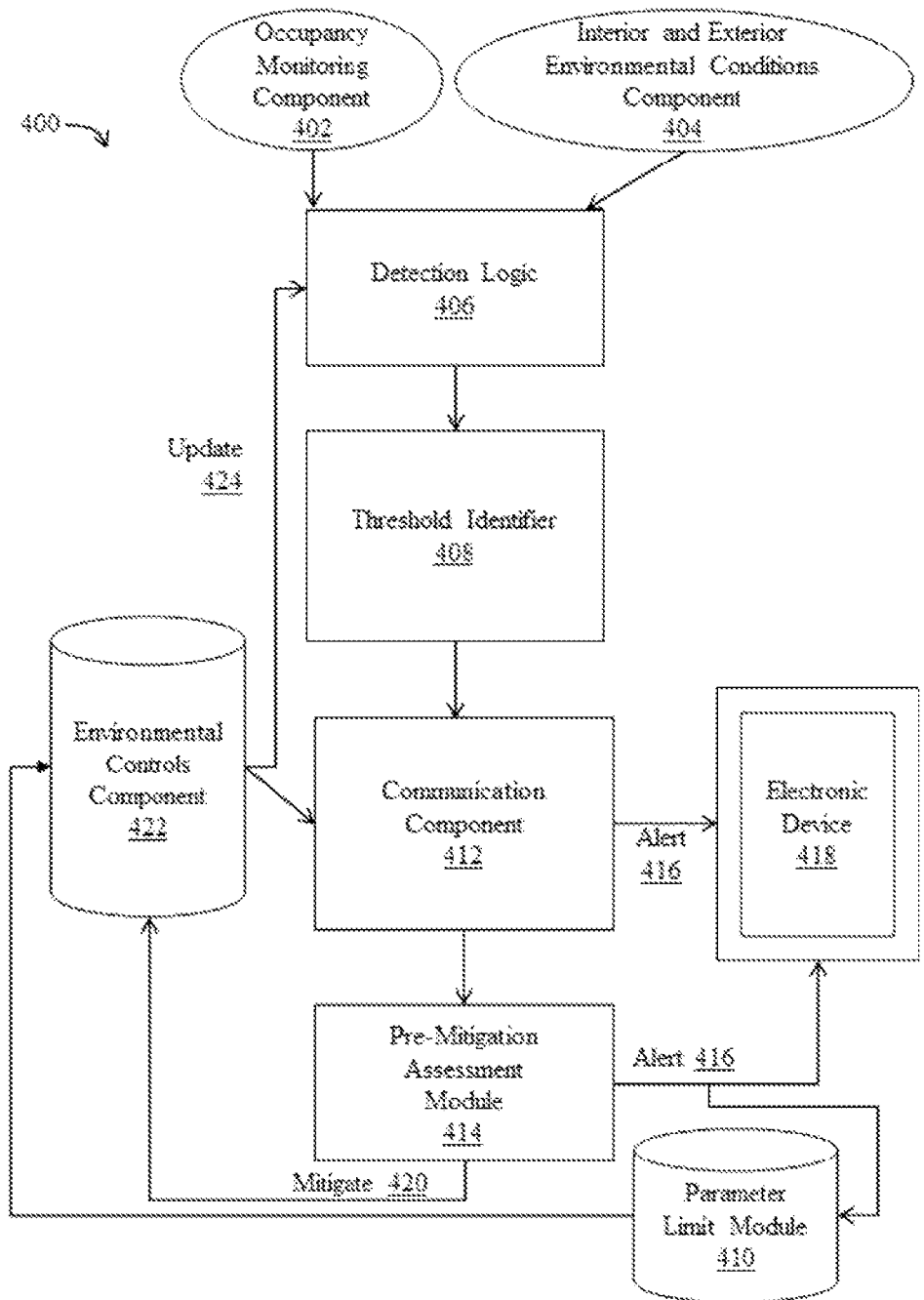
FIG. 4 is a schematic block diagram illustrating components of a computing device, in accordance with an embodiment.

FIG. 4 is a schematic block diagram illustrating components of a computing device. System 400 has occupancy monitoring component 402. Occupancy monitoring component 402 is in communication with detection logic 406 and is configured to collect occupancy data within the vehicle to determine an occupancy status. The occupancy status is if an individual such as a human and/or an animal is in the vehicle or not. Environmental conditions component 404 is in communication with detection logic 406. Environmental conditions component 404 is configured to collect environmental data to determining the environmental status. It is within the scope of this invention for environmental data to be internal and/or external to the vehicle.

Detection logic 406 is configured to receive the occupancy data from occupancy monitoring component 402 and the environmental data from environmental conditions component 404. Detection logic 406 correlates the occupancy data and the environmental data and outputs an occupancy pattern signature. An occupancy pattern signature may be a unique amplitude of oscillations from detected measurements over time obtained from one or more sensors in communication with a computing device. The one or more sensors are configured to detect measurements used to determine if an occupant is in a vehicle and to determine if a dangerous environmental condition is present in the form of an occupancy pattern signature, which may be used as training data for threshold identifier 408.

FIG. 4 shows threshold identifier 408. Threshold identifier 408 is in communication with detection logic 406. Threshold identifier 408 receives and retains/stores the occupancy pattern signatures from detection logic 406. One or more compiled occupancy pattern signatures may serve as training data that may be used to more accurately determine if an occupant is within a vehicle and if that occupant is exposed to a dangerous environmental condition within that vehicle. Threshold identifier 408 compares the occupancy pattern signature with a predetermined value of parameters that define a threshold. For example, the occupancy pattern signature determines a dangerous environmental condition with an occupant in the vehicle when the threshold is exceeded such as when the temperature sensors measure a temperature. The occupancy pattern signature determines a safe environmental condition when the threshold is not exceeded such as when an occupant is in the vehicle and the measured temperature value is between a predetermined range.

Communication component 412 is in communication with threshold identifier 408. In response to the threshold identifier determining a presence of a dangerous environmental condition with an occupant in the vehicle, the communication component 412 sends alert 416 to electronic device 418. Electronic device 418 may be any device such as a smart phone, a tablet, and/or a computer. When threshold identifier 408 determines a presence of the dangerous environmental condition, communication component 412 may send an authorization to pre-mitigation assessment module 414. Pre-mitigation assessment module 414 is in communication with the one or more sensors to identify a safe rescue.

If it has been determined by pre-mitigation assessment module 414 of the system that it is safe to rescue an occupant in a vehicle and mitigate the dangerous environmental condition, pre-mitigation assessment module 414 authorizes the safe rescue. Environmental controls component 422 is in communication with pre-mitigation assessment module 414. In response to receiving an authorization from pre-mitigation assessment module 414 for the safe rescue, one or more vehicle systems may be activated by environmental controls component 422 to mitigate the dangerous environmental condition. Update 424 occurs after mitigation to repeat the cycle to determine if the dangerous environmental condition has resolved.

If it has been determined by pre-mitigation assessment module 414 of the system that it is not safe to rescue an occupant in a vehicle, pre-mitigation assessment module 414 may send alert 416 to electronic device 418 indicating an emergency situation. For example, the pre-mitigation assessment module may determine that the vehicle is in a confined space and that it would be unsafe to start the ignition of a vehicle within the confined space. As a result, for example, the engine will not be turned on, the windows will not be rolled down, and the air conditioning will not be turned on. Further, pre-mitigation assessment module 414 may send alert 416 to parameter limit module 410. In an emergency, when an occupant is in a vehicle, when a dangerous environmental condition is detected, and when the pre-mitigation assessment module 414 determines the vehicle is in a confined space parameter limit module 410 may automatically adjust and/or modify threshold parameters of pre-mitigation assessment module 414 to authorize environmental controls component 422 to be activated intermittently during a confined space scenario. For example, the engine will temporarily be turned on, the windows will temporarily be rolled down, and the air conditioning will temporarily be turned on for any range of time such as approximately 30 seconds to one minute. This intermittent process may occur every 5 minutes until an emergency responder arrives to the vehicle.

Figure 5:
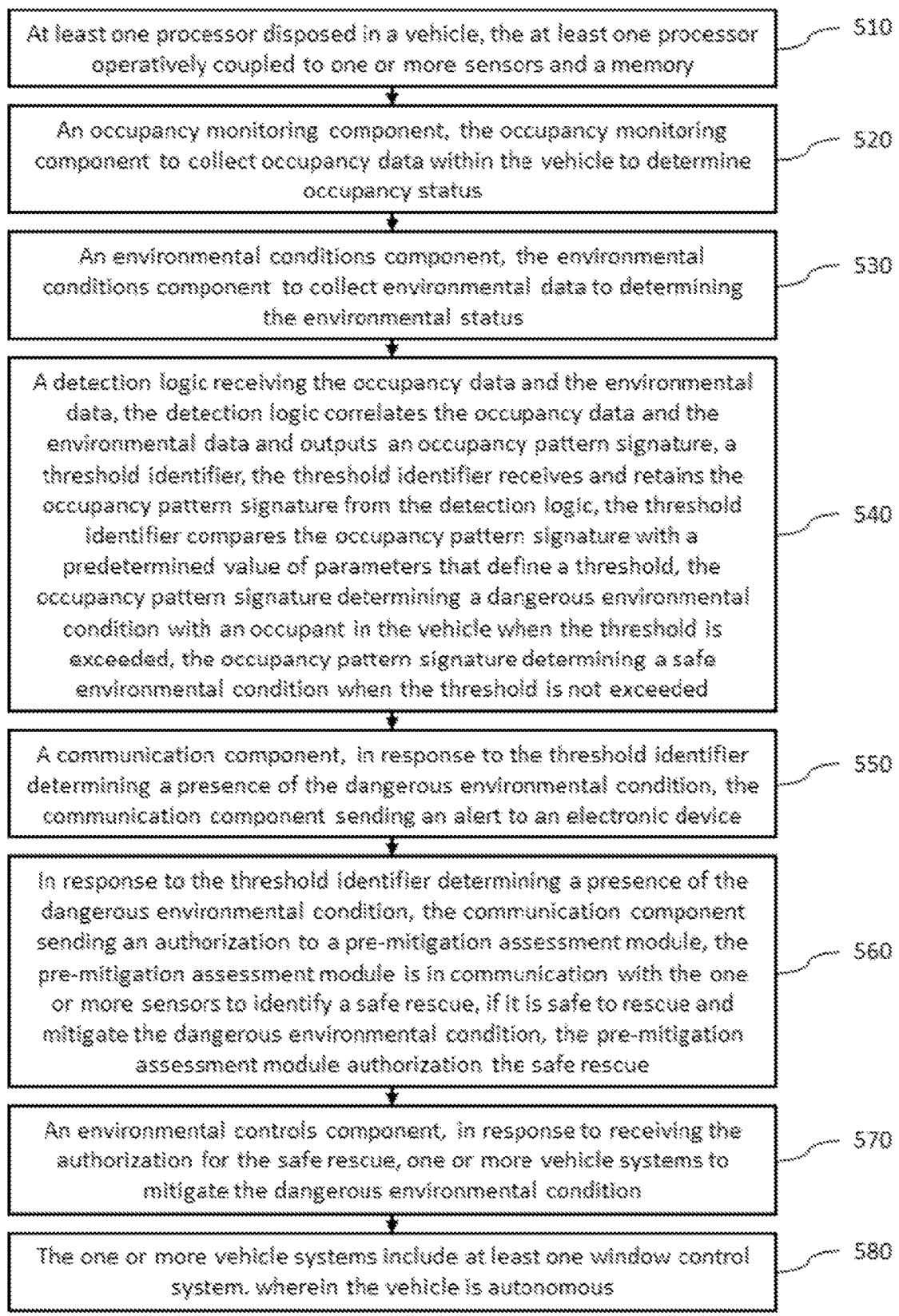
FIG. 5 is a flowchart of an embodiment of a computer-implemented method, in accordance with an embodiment.

FIG. 5 is a flowchart of an embodiment of a computer-implemented method. At step 510, at least one processor is disposed in a vehicle. At least one processor is operatively coupled to one or more sensors and a memory. At step 520, an occupancy monitoring component is provided. The occupancy monitoring component is configured to collect occupancy data within the vehicle to determine occupancy status. At step 530, an environmental conditions component is provided. The environmental conditions component is configured to collect environmental data to determining the environmental status. At step 540, a detection logic is provided. The detection logic is configured to receive the occupancy data and the environmental data. The detection logic correlates the occupancy data and the environmental data and outputs an occupancy pattern signature. The threshold identifier receives and retains the occupancy pattern signature from the detection logic. The threshold identifier compares the occupancy pattern signature with a predetermined value of parameters that define a threshold. The occupancy pattern signature determines a dangerous environmental condition with an occupant in the vehicle when the threshold is exceeded. The occupancy pattern signature determining a safe environmental condition when the threshold is not exceeded.

At step 550, a communication component is provided. In response to the threshold identifier determining a presence of the dangerous environmental condition, the communication component sends an alert to an electronic device. The alert may be any indicating element such as a visual light, a sound, a vibration, a text message, and/or an email.

At step 560, in response to the threshold identifier determining a presence of the dangerous environmental condition, the communication component sends an authorization to a pre-mitigation assessment module. The pre-mitigation assessment module is in communication with the one or more sensors to identify a safe rescue. If it is safe to rescue and mitigate the dangerous environmental condition, the pre-mitigation assessment module authorization the safe rescue. At step 570, an environmental controls component is provided. In response to receiving the authorization for the safe rescue, one or more vehicle systems are authorized to mitigate the dangerous environmental condition. At step 580, the one or more vehicle systems include at least one window control system, wherein the vehicle may be non-autonomous and/or autonomous.

Figure 6:
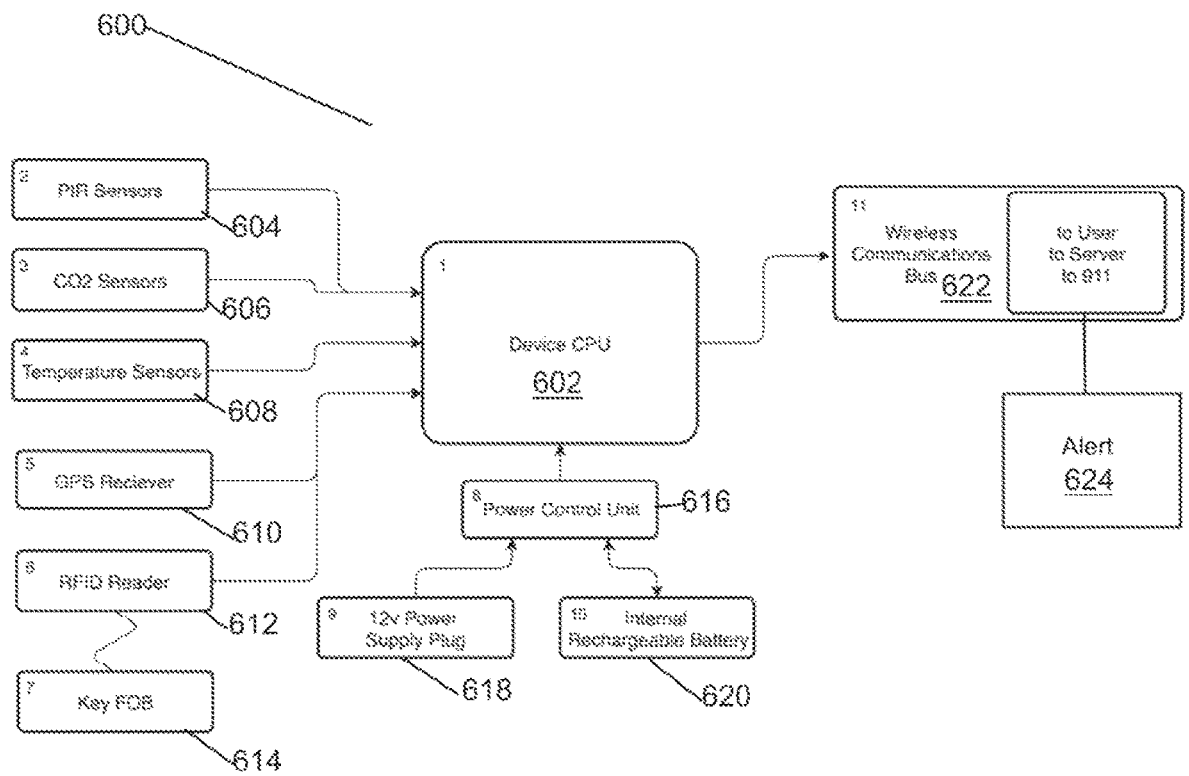
FIG. 6 is a schematic diagram of an aftermarket vehicle occupancy sensor system, in accordance with an embodiment.

FIG. 6 is a schematic diagram of aftermarket vehicle occupancy sensor system 600 featuring the device CPU 602, passive infrared sensors 604, CO2 Sensors 606, temperature sensors 608, a GPS (Global Positioning System) receiver 610, a RFID (Radio-frequency Identification) reader 612, the vehicle's wireless key fob 614, a power and charging control unit 616, a locking 12 v power source plug 618, a rechargeable battery 620, and a wireless communications bus 622.

The enclosed system may comprise of all or some of the components as described is referred to as the device. Sensor refers to all of some of the sensors in this device, including passive infrared sensors 604, CO2 sensors 606, temperature sensors 608, and a GPS (Global Positioning System) receiver 610. CPU 602 and microcontroller are used interchangeably. The device, which may be mounted to the vehicle's 12 v power supply socket (not shown) in the vehicle's center console, contains a microcontroller or CPU 602 capable of interfacing with and receiving data from its connected sensors and the wireless communication bus 622.

The device's microcontroller or CPU 602 may begin powering and receiving sensor data when the RFID reader 612 is unable to detect the presence of the vehicle's key fob 614. The microcontroller or CPU 602 may then attempt to determine whether a person or animal has been left in the vehicle through determining if any motion has been detected by the PIR sensors 604 and through measuring CO2 gas concentrations with the CO2 sensors 606. Movement and increasing CO2 concentrations indicate the presence of a person or animal in the vehicle. The device continuously attempts to determine the presence of life inside the vehicle.

The microcontroller or CPU 602 also monitors the internal air temperature of the vehicle by means of temperature sensors 608. When the presence of a person or animal had been detected in the vehicle and when measured temperatures are above or below pre-defined temperature thresholds or if CO2 gas concentrations exceed a pre-defined threshold, the microcontroller or CPU 602 will, by means of the device's wireless communications bus 622, attempt to alert 624 pre-defined caregivers or emergency services.

Alerts 624 may include information on the vehicle's location as determined by the device's GPS receiver 610, a user-defined description of the vehicle, and any other information that may be relevant to the safe, timely, and effective resolution of a dangerous situation. Alerts may take the form of SMS text messages, pre-recorded or computer-generated voice calls or voicemails, mobile push notifications through a mobile application. Information included in and recipients of alerts may be based on the severity of the threat posed to occupants of the vehicle.

While the vehicle's ignition is on, the device is powered by a plug 618 inserted into the vehicle's 12 v power supply socket. The plug 618 locks into the vehicle's power supply socket to prevent accidental removal or misalignment of the device by means of a firm friction hold. An outward frictional force is applied to the inner wall of the power supply socket by an expanding collet designed into the plug 618, which is engaged via a screw designed into the plug 618. A power control unit 616 switches the device's power source from the 12 v plug 618 to the internal rechargeable battery 620 based on power availability. The power control unit 616 is also responsible for determining the health of and handling charging of the rechargeable battery 620.

In an alternate embodiment of this device, a RFID fob that is separate from the car's wireless key may be used in the place of the car manufacturer's provided fob.

In an alternate embodiment of this device, the microcontroller or CPU 602 may be activated by the power control unit 616 when it reads a significant voltage drop from the car's 12 v power supply socket 618, indicating that the vehicle has been turned off.

In an alternate embodiment of this device, the device may be mounted to the vehicle's 12 v power supply socket in the aft section of the center console between the rear seat passengers' foot wells. In this configuration, PIR sensors 604 and temperature sensors 608 may be mounted in a separate housing to the driver's or passenger's headrest.

In an alternate embodiment of this device, the device may be mounted to the driver's or front passenger's head rests and powered by means of a locking 12 v power cable to any available 12 v power supply socket.

In an alternate embodiment of this device, a mobile application or web-based interface may be used to allow the user to customize alarm recipients, alarm messages, to configure the device, and to view the device's status.

In an alternate embodiment of this device, the device may be powered by the vehicle's USB port.

In an alternate embodiment of this device, the device may be powered by a removable, disposable battery.

In an alternate embodiment of this device, device software may be updated using blockchain technology.

In an alternate embodiment of this device, RF (radio frequency), ultrasonic, and/or microwave object detection and field motion sensors may be used in addition to or in the place of the PIR sensor 604.

In an alternate embodiment of this device, the device coupled with a web-based interface or mobile application may feature a testing system where the device's installer, user, or caregiver may test the field of view of the occupancy sensors to determine if the device will work reliably and effectively. In a testing scenario, all alarms would be deactivated, and information on the activation status the PIR 604 and/or CO2 606 sensors would be available to the user via web-based interface or mobile application, allowing the user to determine sensor accuracy and sensor blind spots, allowing the user to adjust the device's orientation for increased performance.

Figure 7:
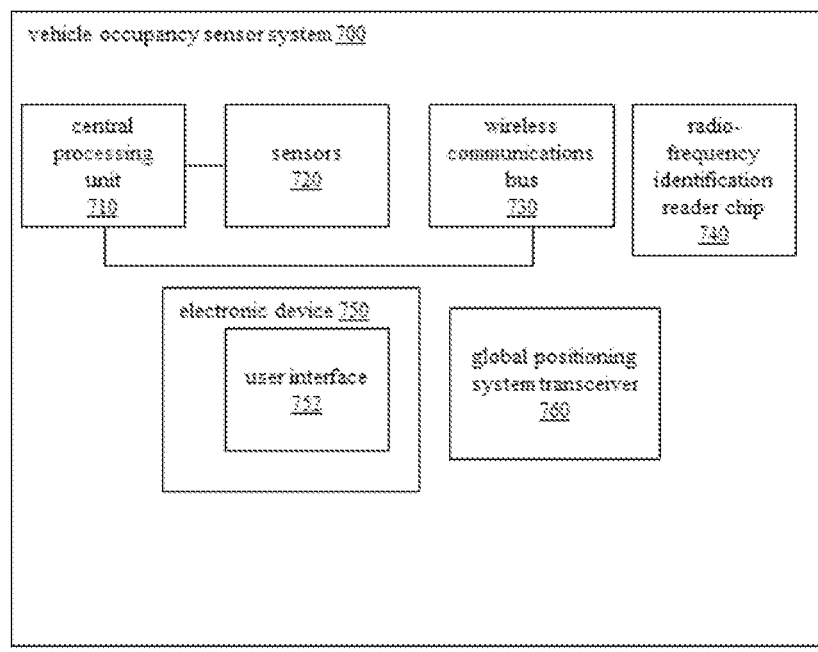
FIG. 7 is a block diagram illustrating a vehicle occupancy sensor system, according to some embodiments of the present disclosure.

FIG. 7 is a block diagram that describes a vehicle occupancy sensor system 700, according to some embodiments of the present disclosure. In some embodiments, the vehicle occupancy sensor system 700 may include an electronic device 750 and a radio-frequency identification reader chip 740. The vehicle occupancy sensor system 700 may also include a central processing unit 710 configured to be electrically connected to a power source of the vehicle. The vehicle occupancy sensor system 700 may also include one or more sensors 720 configured to input raw data into the central processing unit 710.

In some embodiments, the vehicle occupancy sensor system 700 may also include a wireless communications bus 730 electrically connected to the central processing unit 710. The vehicle occupancy sensor system 700 may also include a global positioning system transceiver 760 that may be coupled to the vehicle. The global positioning system transceiver 760 may be configured to receive a radio transmissions broadcast emitted by one or more global positioning system satellites.

In some embodiments, the electronic device 750 may include a user interface 752. The central processing unit 710 may be configured to compare the raw data received from the one or more sensors 720 with a predetermined safety threshold. If the raw data is not within the predetermined safety threshold, the central processing unit 710 may be configured to transmit an alert to the electronic device 750 using the wireless communications bus 730. For example, the predetermined safety threshold may be any unsafe temperature for an individual to be exposed to while contained in a vehicle for an unsafe length of time, such as a temperature over about 100 degrees or under about 40 degrees.

In some embodiments, at least a portion of the occupancy sensor system 700 may be connected to a 12 v power supply socket of the vehicle in an aft section of a center console located between the rear seat passengers foot wells of the vehicle. In some embodiments, the one or more sensors 720 of the occupancy sensor system 700 may be embedded within a headrest of the vehicle. In some embodiments, the one or more sensors 720 may be a gas sensor.

In some embodiments, the gas sensor may be a carbon dioxide. In some embodiments, the one or more sensors 720 may be a temperature sensor, the temperature sensor may be configured to monitor an internal air temperature of the vehicle. In some embodiments, the one or more sensors 720 may be a passive infrared sensor. In some embodiments, the alert may include location coordinates of the vehicle. The global positioning system transceiver 760 may be configured to transmit a radio transmissions broadcast emitted by one or more global positioning system satellites to the electronic device 750.

In some embodiments, the alert may include a location of the vehicle over a wireless communications channel. In some embodiments, the vehicle occupancy sensor system 700 may also include a power control unit configured to power the central processing unit 710 using a rechargeable battery when an ignition of the vehicle may be off. The central processing unit 710 may be electrically connected to the rechargeable battery.

In some embodiments, the central processing unit 710 of the occupancy sensor system 700 may be configured to be activated by the power control unit when the power control unit may detect a voltage drop from a 12 v power supply socket of the vehicle. In some embodiments, the occupancy sensor system 700 may be mounted to a headrest of the vehicle and the central processing unit 710 may be powered by a locking 12 v power cable connected to a 12 v power supply socket of the vehicle. In some embodiments, the occupancy sensor system 700 may be updated using blockchain technology.

Figure 8:
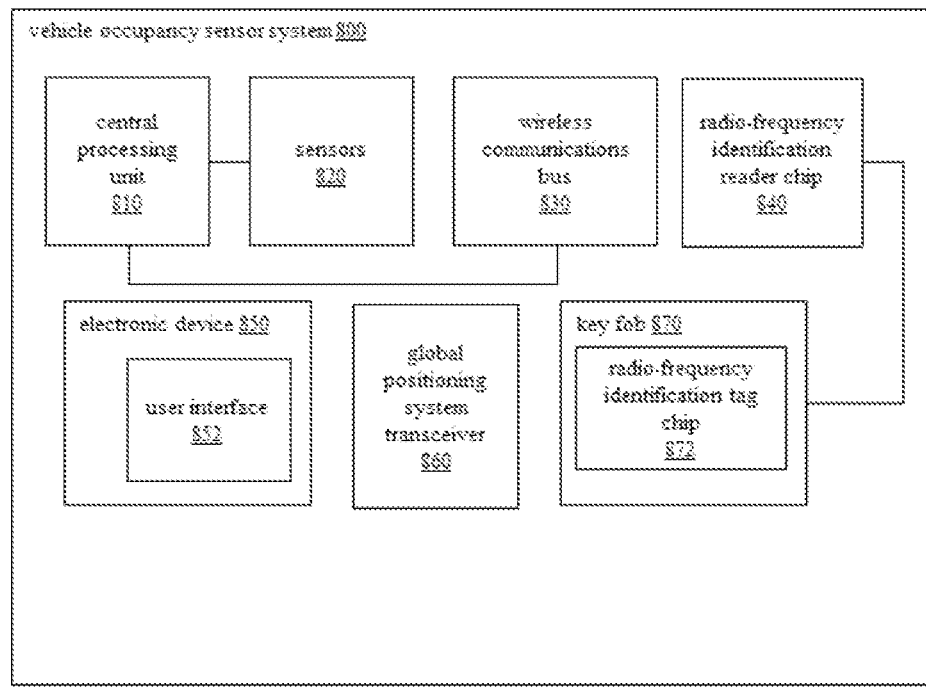
FIG. 8 is a block diagram further illustrating the vehicle occupancy sensor system from FIG. 7, according to some embodiments of the present disclosure.

FIG. 8 is a block diagram that further describes the vehicle occupancy sensor system 700 from FIG. 7, according to some embodiments of the present disclosure. In some embodiments, the vehicle occupancy sensor system 700 may include a key fob 870. The key fob 870 may also include a radio-frequency identification tag chip 872. The key fob 870 may be electrically connected to the radio-frequency identification reader chip 740 of the occupancy sensor system 700. In some embodiments, the central processing unit 710 of the occupancy sensor system 700 may be configured to power on when the key fob 870 may exceed a predetermined distance from the radio-frequency identification reader chip 740 of the occupancy sensor system 700 to initiate activation of the one or more sensors 720. The predetermined distance may be a distance the key fob is located away from the vehicle to indicate to the system that the driver is no longer within an accessible proximity to the vehicle such as, a range of about 5 feet to about ten feet in length away from a vehicle.

Figure 9:
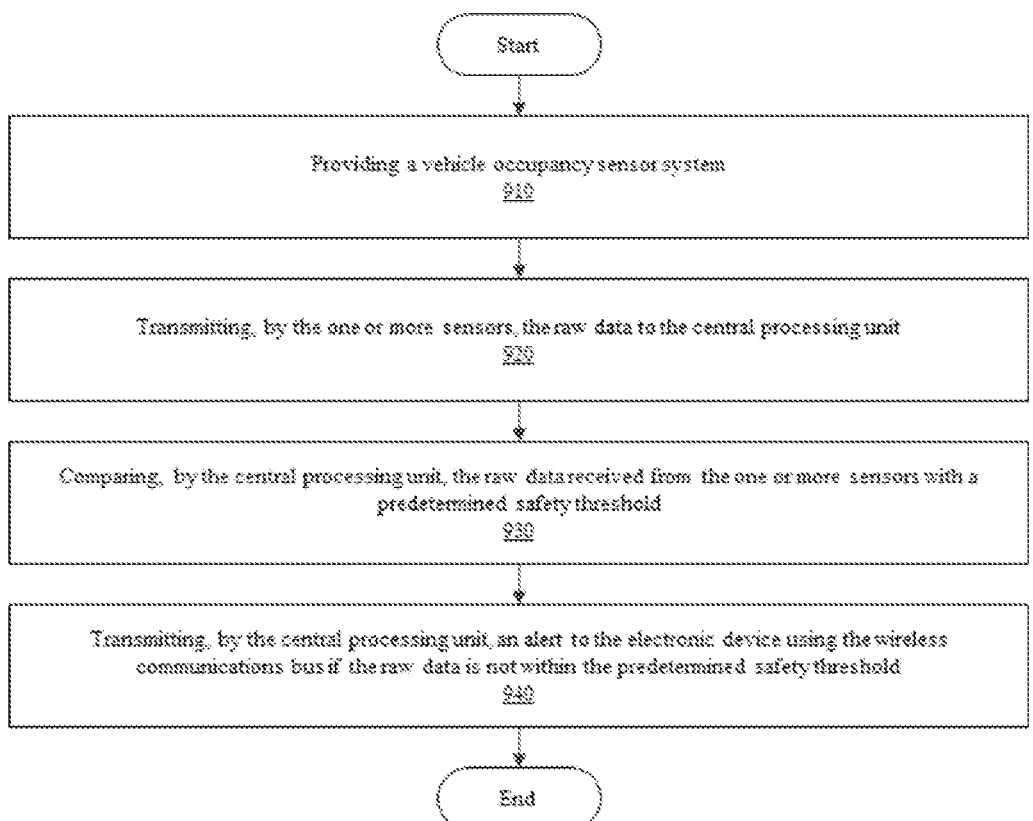
FIG. 9 is a flowchart illustrating a computer-implemented method, according to some embodiments of the present disclosure.

FIG. 9 is a flowchart that describes a computer-implemented method, according to some embodiments of the present disclosure. In some embodiments, at 910, the computer-implemented method may include providing a vehicle occupancy sensor system. At 920, the computer-implemented method may include transmitting, by the one or more sensors, the raw data to the central processing unit. At 930, the computer-implemented method may include comparing, by the central processing unit, the raw data received from the one or more sensors with a predetermined safety threshold. At 940, the computer-implemented method may include transmitting, by the central processing unit, an alert to the electronic device using the wireless communications bus if the raw data may be not within the predetermined safety threshold.

In some embodiments, a central processing unit, the central processing unit may be configured to be electrically connected to a power source of a vehicle. One or more sensors, the one or more sensors may be configured to input raw data into the central processing unit. An electronic device, the electronic device having a user interface. A wireless communications bus, the wireless communications bus may be electrically connected to the central processing unit.

Figure 10:
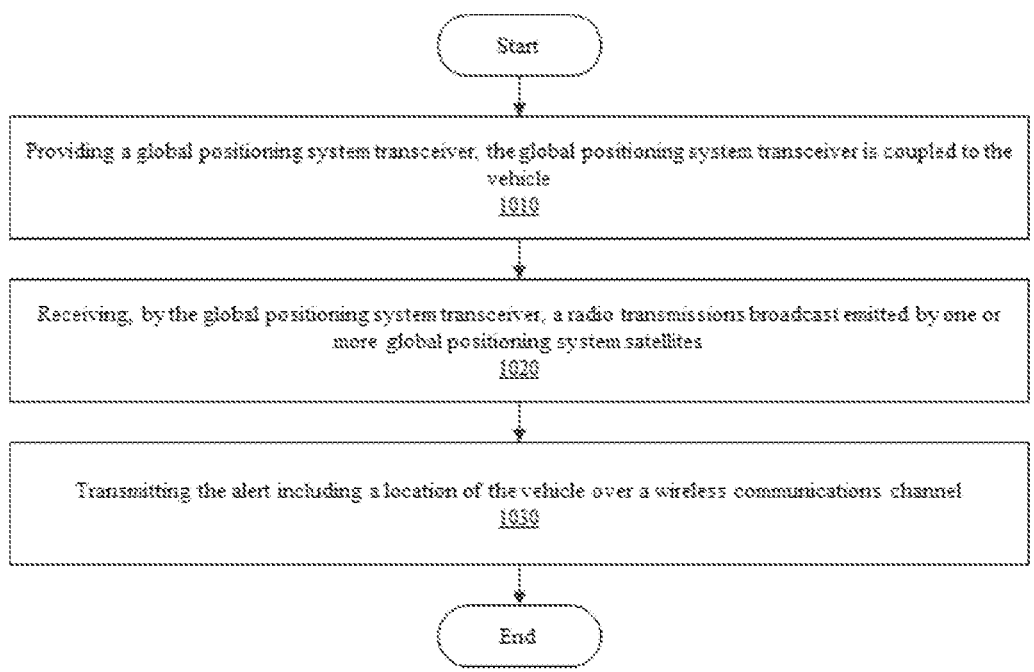
FIG. 10 is a flowchart further illustrating the computer-implemented method from FIG. 9, according to some embodiments of the present disclosure.

FIG. 10 is a flowchart that further describes the computer-implemented method from FIG. 9, according to some embodiments of the present disclosure. In some embodiments, at 1010, the computer-implemented method may include providing a global positioning system transceiver, the global positioning system transceiver may be coupled to the vehicle. At 1020, the computer-implemented method may include receiving, by the global positioning system transceiver, a radio transmissions broadcast emitted by one or more global positioning system satellites. At 1030, the computer-implemented method may include transmitting the alert including a location of the vehicle over a wireless communications channel.

Figure 11:
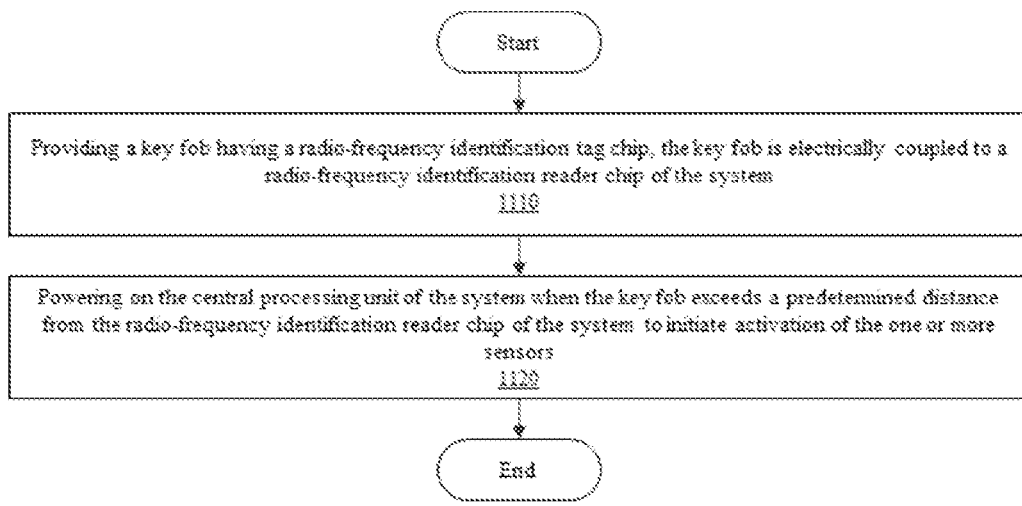
FIG. 11 is a flowchart further illustrating the computer-implemented method from FIG. 9, according to some embodiments of the present disclosure.

FIG. 11 is a flowchart that further describes the computer-implemented method from FIG. 9, according to some embodiments of the present disclosure. In some embodiments, at 1110, the computer-implemented method may include providing a key fob having a radio-frequency identification tag chip, the key fob may be electrically coupled to a radio-frequency identification reader chip of the system. At 1120, the computer-implemented method may include powering on the central processing unit of the system when the key fob exceeds a predetermined distance from the radio-frequency identification reader chip of the system to initiate activation of the one or more sensors.

Additional Description

It is within the scope of this invention for the system to have an artificial intelligence (AI) Component such as a machine learning algorithm and/or a neural network. The real-time sensor data and/or with the data history may be input into the machine learning algorithm, for example. The input data may be used to train the AI component while it continues to learn and analyze the patterns associated with the vehicle. This implies the AI component is an in-vehicle independent system but has the ability to connect to the cloud and/or other networks for additional data, updates and/or processing requirements. This process will assist in determining occupancy status while also determining the interior and exterior environmental status. The end result could be the AI component output data associated with an assessment of the occupancy status, the internal and/or external conditions, and/or determine if alerts should be sent while also attempting to return the interior environment back to a tolerable level.

For example, the system will use the data collected from the Occupancy and Monitoring component, Interior and Exterior Environmental Conditions component to make assumptions about the occupancy and environmental conditions. If it determines the conditions are dangerous for a person or animal, the AI component may trigger the Communication component to send alerts and use the vehicles Environmental Controls component to attempt to return the vehicle's interior environment back to a tolerable level for the occupants until help arrives.

Disclosed herein are system, method, and computer program product embodiments for detecting, alerting, and acting to prevent unattended vehicle deaths. An embodiment operates by receiving one or more signals from one or more presence sensors in a vehicle and analyzing the signals to detect the presence of a person or animal inside the vehicle. The system further receives one or more signals from one or more environment sensors on the vehicle and analyzes the signals to detect a dangerous environmental condition. If the system determines that both the presence of a person or animal has been detected inside the vehicle and a dangerous environmental condition has been detected, it activates one or more vehicle systems that mitigate the dangerous environmental condition and sends an alert to one or more predetermined recipients. It is within the scope of this invention for an alert to include a warning inside and/or outside a vehicle.

The Aftermarket Sensor System is intended to combat the tragic thirty seven hot-car related child deaths that, on average, occur every year as well as protect the elderly, the infirm, and animals left in vehicles in dangerous heat conditions. The system relies on a set of sensors, to determine whether a person or animal has been left in a vehicle. It then determines whether a threat is posed to the person or animal through temperature and hazardous gas sensors. Following a determination that the person or animal is in danger, the system contacts vehicle owners, caregivers, and/or emergency services.

In some aspects, the techniques described herein relate to a computer-implemented method including, by at least one processor: providing a system including: the at least one processor disposed in a vehicle, the at least one processor operatively coupled to one or more sensors and a memory; an occupancy monitoring component, the occupancy monitoring component to collect occupancy data within the vehicle to determine occupancy status; an environmental conditions component, the environmental conditions component to collect environmental data to determining an environmental status; a detection logic, the detection logic to receive the occupancy data and the environmental data, the detection logic correlates the occupancy data and the environmental data and outputs an occupancy pattern signature; a threshold identifier, the threshold identifier receives and retains the occupancy pattern signature from the detection logic, the threshold identifier compares the occupancy pattern signature with a predetermined value of parameters that define a threshold, the occupancy pattern signature determining a dangerous environmental condition with an occupant in the vehicle when the threshold is exceeded, the occupancy pattern signature determining a safe environmental condition when the threshold is not exceeded.

In some aspects, the techniques described herein relate to a computer-implemented method, further including: receiving one or more signals from one or more surroundings sensors on the vehicle; and analyzing the one or more signals from the one or more surroundings sensors to determine whether the vehicle is in an enclosed space, wherein activating one or more vehicle systems is based on whether the vehicle is determined to be in the enclosed space.

In some aspects, the techniques described herein relate to a computer-implemented method, further including one or more presence sensors having at least one seat weight sensor.

In some aspects, the techniques described herein relate to a computer-implemented method, wherein the one or more presence sensors include at least one ultrasonic sensor.

In some aspects, the techniques described herein relate to a computer-implemented method, wherein one or more environment sensors include at least one temperature sensor.

In some aspects, the techniques described herein relate to a computer-implemented method, wherein the one or more environment sensors include at least one carbon monoxide sensor.

In some aspects, the techniques described herein relate to a computer-implemented method, wherein one or more vehicle systems that mitigate the dangerous environmental condition includes at least one window control system.

In some aspects, the techniques described herein relate to a computer-implemented method, further including sending an alert to one or more predetermined recipients.

In some aspects, the techniques described herein relate to a computer-implemented method, wherein sending the alert includes sending a message including a location of the vehicle over a wireless communications channel, the message including the location of a vehicle.

In some aspects, the techniques described herein relate to a computer-implemented method, further including determining the vehicle is unattended based on a key fob sensor.

In some aspects, the techniques described herein relate to a computer-implemented method, further including determining the vehicle is unattended based on an ignition sensor.

In some aspects, the techniques described herein relate to a computer-implemented method, further including determining the vehicle is unattended based on a for example, a driver's seat belt buckle sensor, an ignition sensor, and/or a key FOB.

In some aspects, the techniques described herein relate to a computer-implemented method, further including receiving the one or more signals from one or more presence sensors in the vehicle includes periodically receiving the one or more signals from the one or more presence sensors in the vehicle, and the analyzing the signals includes comparing the signals to detect any change in the presence of the occupant.

In some aspects, the techniques described herein relate to a computer-implemented method, further including analyzing one or more signals from one or more environment sensors to detect the dangerous environmental condition further includes periodically measuring a signal from a toxic gas sensor; and comparing the measurements to detect any increase in toxic gas inside the vehicle.

In some aspects, the techniques described herein relate to a system, including: at least one processor disposed in a vehicle, the at least one processor operatively coupled to one or more sensors and a memory; an occupancy monitoring component, the occupancy monitoring component to collect occupancy data within the vehicle to determine occupancy status; an environmental conditions component, the environmental conditions component to collect environmental data to determining the environmental status; a detection logic, the detection logic to receive the occupancy data and the environmental data, the detection logic correlates the occupancy data and the environmental data and outputs an occupancy pattern signature; and a threshold identifier, the threshold identifier receives and retains the occupancy pattern signature from the detection logic, the threshold identifier compares the occupancy pattern signature with a predetermined value of parameters that define a threshold, the occupancy pattern signature determining a dangerous environmental condition with an occupant in the vehicle when the threshold is exceeded, the occupancy pattern signature determining a safe environmental condition when the threshold is not exceeded.

In some aspects, the techniques described herein relate to a system, further including a communication component, in response to the threshold identifier determining a presence of the dangerous environmental condition, the communication component sending an alert to an electronic device.

In some aspects, the techniques described herein relate to a system, further including a communication component, in response to the threshold identifier determining a presence of the dangerous environmental condition, the communication component sending an authorization to a pre-mitigation assessment module, the pre-mitigation assessment module is in communication with the one or more sensors to identify a safe rescue, if it is safe to rescue and mitigate the dangerous environmental condition, the pre-mitigation assessment module authorization the safe rescue.

In some aspects, the techniques described herein relate to a system, further including an environmental controls component, in response to receiving the authorization for the safe rescue, one or more vehicle systems to mitigate the dangerous environmental condition.

In some aspects, the techniques described herein relate to a system, wherein the one or more vehicle systems include at least one window control system.

In some aspects, the techniques described herein relate to a system, wherein the vehicle is autonomous.

In some aspects, if the vehicle is autonomous, the AI component may also trigger the vehicle to remove itself from the dangerous environmental conditions and proceed to the nearest location such as a police or fire station for emergency services.

In some aspects, the techniques described herein relate to a computer-implemented method including, by at least one processor: receiving one or more signals from one or more presence sensors in a vehicle; analyzing the one or more signals from the one or more presence sensors to detect the presence of a person or animal inside the vehicle; receiving one or more signals from one or more environment sensors on the vehicle; analyzing the one or more signals from the one or more environment sensors to detect a dangerous environmental condition; determining that the presence of a person or animal has been detected inside the vehicle and a dangerous environmental condition has been detected; activating one or more vehicle systems that mitigate the dangerous environmental condition; and activating any alert including, but not limited to, a visual alert, an audible alert, and/or a haptic warning of the vehicle.

In some aspects, the techniques described herein relate to a method, further including: receiving one or more signals from one or more surroundings sensors on the vehicle; and analyzing the one or more signals from the one or more surroundings sensors to determine whether the vehicle is in an enclosed space, wherein the activating the one or more vehicle systems is based on whether the vehicle is determined to be in an enclosed space.

In some aspects, the techniques described herein relate to a method, wherein the one or more presence sensors include at least one seat weight sensor.

In some aspects, the techniques described herein relate to a method, wherein the one or more presence sensors include at least one ultrasonic sensor.

In some aspects, the techniques described herein relate to a method, wherein the one or more environment sensors include at least one temperature sensor.

In some aspects, the techniques described herein relate to a method, wherein the one or more environment sensors include at least one carbon monoxide sensor.

In some aspects, the techniques described herein relate to a method, wherein the one or more vehicle systems that mitigate the dangerous environmental condition includes at least one window control system.

In some aspects, the techniques described herein relate to a method, further including sending an alert to one or more predetermined recipients.

In some aspects, the techniques described herein relate to a method, wherein sending the alert includes sending a message including the vehicle's location over a wireless communications channel, the message including the vehicle's location.

In some aspects, the techniques described herein relate to a method, further including determining the vehicle is unattended based on a key fob sensor.

In some aspects, the techniques described herein relate to a method, further including determining the vehicle is unattended based on an ignition sensor.

In some aspects, the techniques described herein relate to a method, further including determining the vehicle is unattended based on a driver's seat belt buckle sensor.

In some aspects, the techniques described herein relate to a method, wherein the receiving one or more signals from one or more presence sensors in a vehicle includes periodically receiving the one or more signals from one or more presence sensors in the vehicle, and the analyzing the signals includes comparing the signals to detect any change in the presence of the person or animal.

In some aspects, the techniques described herein relate to a method, the analyzing the one or more signals from the one or more environment sensors to detect a dangerous environmental condition further includes periodically measuring a signal from a toxic gas sensor; and comparing the measurements to detect any increase in toxic gas inside the vehicle.

In some aspects, the techniques described herein relate to a system, including: at least one processor disposed in a vehicle, the processor operatively coupled to: one or more presence sensors; one or more environment sensors; and a memory; and the at least one processor configured to: receive one or more signals from the one or more presence sensors in the vehicle; analyze the one or more signals from the one or more presence sensors to detect the presence of a person or animal inside the vehicle; receive one or more signals from the one or more environment sensors in the vehicle; analyze the one or more signals from the one or more environment sensors to detect a dangerous environmental condition; determine that the presence of a person or animal has been detected inside the vehicle and a dangerous environmental condition has been detected; activate one or more vehicle systems that mitigate the dangerous environmental condition; and activate an audible alert of the vehicle.

In some aspects, the techniques described herein relate to a system, wherein the processor is further configured to cause an alert to be sent wirelessly to one or more predetermined recipients, the alert including a message that includes the vehicle's location.

In some aspects, the techniques described herein relate to a system, wherein the one or more presence sensors include at least one seat weight sensor and at least one ultrasonic sensor, and the one or more environment sensors include at least one temperature sensor and at least one carbon monoxide sensor.

In some aspects, the techniques described herein relate to a system, wherein the one or more vehicle systems that mitigate the dangerous environmental condition include at least one window control system.

In some aspects, the techniques described herein relate to a tangible computer-readable device having instructions stored thereon that, when executed by at least one computing device, causes the at least one computing device to perform operations including: receiving one or more signals from one or more presence sensors in a vehicle; analyzing the one or more signals from the one or more presence sensors to detect the presence of a person or animal inside the vehicle; receiving one or more signals from one or more environment sensors on the vehicle; analyzing the one or more signals from the one or more environment sensors to detect a dangerous environmental condition; determining that the presence of a person or animal has been detected inside the vehicle and a dangerous environmental condition has been detected; activating one or more vehicle systems that mitigate the dangerous environmental condition; and activating an audible alert of the vehicle.

In some aspects, the techniques described herein relate to a tangible computer-readable device, wherein the instructions further include instructions to cause an alert to be wirelessly sent to one or more predetermined recipients, the alert including the vehicle's location.

In some aspects, the techniques described herein relate to an occupancy sensor system for a vehicle, including: a central processing unit, the central processing unit is configured to be electrically connected to a power source of the vehicle; one or more sensors, the one or more sensors are configured to input raw data into the central processing unit; an electronic device, the electronic device having a user interface; a wireless communications bus, the wireless communications bus is electrically connected to the central processing unit, wherein the central processing unit is configured to compare the raw data received from the one or more sensors with a predetermined safety threshold, wherein if the raw data is not within the predetermined safety threshold, the central processing unit is configured to transmit an alert to the electronic device using the wireless communications bus; a global positioning system transceiver, the global positioning system transceiver is coupled to the vehicle, the global positioning system transceiver is configured to receive a radio transmissions broadcast emitted by one or more global positioning system satellites; and a radio-frequency identification reader chip.

In some aspects, the techniques described herein relate to an occupancy sensor system, wherein at least a portion of the occupancy sensor system is connected to a 12 v power supply socket of the vehicle in an aft section of a center console located between a rear seat passengers' foot wells of the vehicle.

In some aspects, the techniques described herein relate to an occupancy sensor system, wherein the one or more sensors of the occupancy sensor system are embedded within a headrest of the vehicle.

In some aspects, the techniques described herein relate to an occupancy sensor system, wherein the one or more sensors is a gas sensor.

In some aspects, the techniques described herein relate to an occupancy sensor system, wherein the gas sensor is a carbon dioxide.

In some aspects, the techniques described herein relate to an occupancy sensor system, wherein the one or more sensors is a temperature sensor, the temperature sensor is configured to monitor an internal air temperature of the vehicle.

In some aspects, the techniques described herein relate to an occupancy sensor system, wherein the one or more sensors is a passive infrared sensor.

In some aspects, the techniques described herein relate to an occupancy sensor system, further including: a key fob having a radio-frequency identification tag chip, the key fob is electrically connected to the radio-frequency identification reader chip of the occupancy sensor system.

In some aspects, the techniques described herein relate to an occupancy sensor system, wherein the central processing unit of the occupancy sensor system is configured to power on when the key fob exceeds a predetermined distance from the radio-frequency identification reader chip of the occupancy sensor system to initiate activation of the one or more sensors.

In some aspects, the techniques described herein relate to an occupancy sensor system, wherein the alert includes location coordinates of the vehicle, wherein the global positioning system transceiver is configured to transmit a radio transmissions broadcast emitted by one or more global positioning system satellites to the electronic device.

In some aspects, the techniques described herein relate to an occupancy sensor system, wherein the alert includes a location of the vehicle over a wireless communications channel.

In some aspects, the techniques described herein relate to an occupancy sensor system, further including: a power control unit, the power control unit is configured to power the central processing unit using a rechargeable battery when an ignition of the vehicle is off, the central processing unit is electrically connected to the rechargeable battery.

In some aspects, the techniques described herein relate to an occupancy sensor system, wherein the central processing unit of the occupancy sensor system is configured to be activated by the power control unit when the power control unit detects a voltage drop from a 12 v power supply socket of the vehicle.

In some aspects, the techniques described herein relate to an occupancy sensor system, wherein the occupancy sensor system is mounted to a headrest of the vehicle and the central processing unit is powered by a locking 12 v power cable connected to a 12 v power supply socket of the vehicle.

In some aspects, the techniques described herein relate to an occupancy sensor system, wherein the occupancy sensor system is updated using blockchain technology.

In some aspects, the techniques described herein relate to a computer-implemented method, including: providing a system, including: a central processing unit, the central processing unit is configured to be electrically connected to a power source of a vehicle; one or more sensors, the one or more sensors are configured to input raw data into the central processing unit; an electronic device, the electronic device having a user interface; and a wireless communications bus, the wireless communications bus is electrically connected to the central processing unit; transmitting, by the one or more sensors, the raw data to the central processing unit; comparing, by the central processing unit, the raw data received from the one or more sensors with a predetermined safety threshold; and transmitting, by the central processing unit, an alert to the electronic device using the wireless communications bus if the raw data is not within the predetermined safety threshold.

In some aspects, the techniques described herein relate to a computer-implemented method, further including: providing a global positioning system transceiver, the global positioning system transceiver is coupled to the vehicle; and receiving, by the global positioning system transceiver, a radio transmissions broadcast emitted by one or more global positioning system satellites, wherein the alert includes a location of the vehicle over a wireless communications channel.

In some aspects, the techniques described herein relate to a computer-implemented method, further including: providing a key fob having a radio-frequency identification tag chip, the key fob is electrically connected to a radio-frequency identification reader chip of the system; wherein powering on the central processing unit of the system when the key fob exceeds a predetermined distance from the radio-frequency identification reader chip of the system to initiate activation of the one or more sensors.

Herein, a computer-readable non-transitory storage medium or media may include one or more semiconductor-based or other integrated circuits (ICs) (such, as for example, field programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer readable non-transitory storage media, or any suitable combination of two or more of these, where appropriate. A computer-readable non-transitory storage medium may be volatile, non-volatile, or a combination of volatile and non-volatile, where appropriate.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment." or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above described exemplary embodiments, but should be defined only in accordance with the following claims and their equivalents.

What is claimed is:

1. An occupancy sensor system for a vehicle, comprising:
a central processing unit, the central processing unit being configured to be electrically connected to a power source of the vehicle;
one or more sensors, the one or more sensors being configured to input raw data into the central processing unit;
a wireless communications bus, the wireless communications bus being in electrical signal communication with the central processing unit,
wherein the central processing unit is configured to compare the raw data received from the one or more sensors with a predetermined safety threshold, wherein if the raw data is not within the predetermined safety threshold, the central processing unit is configured to transmit an alert to a remote electronic device using the wireless communications bus;
a radio-frequency identification reader that responds to proximity of a key fob and wherein the input of the raw data from the one or more sensors into the central processing unit is activated in response to a determination that the key fob exceeds a predetermined distance from the radio-frequency identification reader.

2. The occupancy sensor system of claim 1, wherein the one or more sensors includes at least one gas sensor.

3. The occupancy sensor system of claim 2, wherein the at least one gas sensor includes a sensor that provides an indication of the level of carbon dioxide.

4. The occupancy sensor system of claim 1, wherein the one or more sensors includes at least one temperature sensor configured to monitor an internal air temperature of the vehicle.

5. The occupancy sensor system of claim 1, wherein the one or more sensors is a includes at least one passive infrared sensor.

6. The occupancy sensor system of claim 1, further comprising:
a global positioning system transceiver configured to receive a radio transmissions broadcast emitted by one or more global positioning system satellites to determine a current location of the vehicle, wherein the alert transmitted to a remote electronic device includes the current location coordinates of the vehicle.

7. The occupancy sensor system of claim 1, wherein the alert includes a location of the vehicle over a wireless communications channel.

8. The occupancy sensor system of claim 1, further comprising:
a power control unit configured to power the central processing unit using a rechargeable battery when an ignition of the vehicle is off.

9. The occupancy sensor system of claim 1, wherein the occupancy sensor system is updated using blockchain technology.

10. The system of claim 1 wherein the central processing unit is configured to direct at least one vehicle system to perform a mitigating action responsive to the raw data being determined not within the predetermined safety threshold, the mitigating action including at least one action selected from the group of,
activating a climate control system of the vehicle to change the internal temperature,
activating at least one window of the vehicle to change its position,
activating an audible warning signal, and
activating a visual warning signal.

11. The system of claim 10 wherein the central processing unit is configured to, prior to taking any mitigating action that requires activating a climate control system of the vehicle or at least one window of the vehicle, make a determination of whether the vehicle is in a confined space and, if so, makes such mitigating action subject to such determination.

12. A computer-implemented method, comprising the steps of:
determining via a radio-frequency identification (RFID) reader of a vehicle whether a key fob exceeds a predetermined distance from the radio-frequency identification reader;
responsive to such determination, activating one or more sensors located in the vehicle;
receiving and processing raw data transmitted by the one or more sensors by a central processing unit;
comparing, by the central processing unit, the raw data received from the one or more sensors with a predetermined safety threshold; and
transmitting, by the central processing unit, an alert to a remote electronic device via wireless communications if the raw data is not within the predetermined safety threshold.

13. The computer-implemented method of claim 12, further comprising the step of:
receiving, by a global positioning system transceiver, a radio transmissions broadcast emitted by one or more global positioning system satellites and processing such broadcast to determine a current location of the vehicle, wherein the alert includes information on the current location of the vehicle.

14. The method of claim 12 further comprising the step of:
directing at least one vehicle system to perform a mitigating action responsive to the raw data being determined not within the predetermined safety threshold, the mitigating action including at least one action selected from the group of,
activating a climate control system of the vehicle to change the internal temperature,
activating at least one window of the vehicle to change its position,
activating an audible warning signal, and
activating a visual warning signal.

15. The method of claim 14 further comprising the step of:
prior to taking any mitigating action that requires activating a climate control system of the vehicle or at least one window of the vehicle, determining whether the vehicle is in a confined space and, if so, making such mitigating action subject to such determination.

16. A storage medium comprising instructions that, when executed by a processing device in electrical signal communication with at least one sensor, with a wireless communications capability, and with an RFID reader, executes the method of claim 12.

17. The storage medium of claim 16 further comprising instructions that, when executed by a processing device, perform the further step of claim 14.

18. An occupancy sensor system for a vehicle, comprising:
a central processing unit, the central processing unit being configured to be electrically connected to a power source of the vehicle;
one or more sensors, the one or more sensors being configured to input raw data into the central processing unit,
wherein the central processing unit is configured to compare the raw data received from the one or more sensors with a predetermined safety threshold, wherein if the raw data is not within the predetermined safety threshold, the central processing unit directs at least one vehicle system to perform a mitigating action selected from the group of,
activating a climate control system of the vehicle to change the internal temperature,
activating at least one window of the vehicle to change its position,
activating an audible warning signal, and
activating a visual warning signal;
a radio-frequency identification reader that responds to proximity of a key fob and wherein the input of the raw data from the one or more sensors into the central processing unit is activated in response to a determination that the key fob exceeds a predetermined distance from the radio-frequency identification reader.

19. The system of claim 18 wherein the central processing unit is configured to, prior to taking any mitigating action that requires activating a climate control system of the vehicle or at least one window of the vehicle, checks to determine whether the vehicle is in a confined space and, if so, makes such mitigating action subject to such determination.

* * * * *